United States Patent [19]

Snyder et al.

[11] 4,218,248

[45] Aug. 19, 1980

[54] PROCESS FOR THE MANUFACTURE OF METAL JOINING PASTE

[75] Inventors: John L. Snyder, Cleveland, Ohio; Paul D. Johnson, Merrillville, Ind.

[73] Assignee: SCM Corporation, New York, N.Y.

[21] Appl. No.: 897,931

[22] Filed: Apr. 21, 1978

[51] Int. Cl.$^2$ .............................................. C09D 5/10
[52] U.S. Cl. .................. 106/1.12; 106/1.17; 106/1.25; 148/25
[58] Field of Search ............ 106/1.12, 1.25, 1.29, 106/219, 237, 238, 241, 1.17, 266; 148/23, 25; 29/160.6, 148.4 S; 228/223; 260/29.1 R, 30.2, 326.45

[56] References Cited

U.S. PATENT DOCUMENTS

| | | | |
|---|---|---|---|
| 2,547,771 | 3/1950 | Pessel | 148/25 |
| 2,566,339 | 9/1951 | Klinker | 148/25 |
| 3,309,239 | 3/1967 | Harris et al. | 148/23 |

Primary Examiner—Donald J. Arnold
Assistant Examiner—W. Thompson
Attorney, Agent, or Firm—Richard H. Thomas

[57] ABSTRACT

A process for making metal joining paste, particularly suitable for precision soldering and brazing, which comprises preparing a paste vehicle by mixing together, at an elevated temperature, paste ingredients including solvent, flux and specialized additives, cooling said vehicle, and blending metal powder therewith. Blending preferably is subsequent to cooling, but can be simultaneous with cooling, though without significant exposure of the metal to the vehicle at elevated temperature. Cooling of the vehicle takes place under shock cooling conditions, such as to obtain a fine particle size suspension, and is to a final temperature inhibitive of significant reaction of metal powder with vehicle acidic constituents. The present invention provides increased viscosity control and suspension stability necessary for fine bore automatic dispensing of the paste.

15 Claims, 2 Drawing Figures

PROCESS FOR THE MANUFACTURE OF METAL JOINING PASTE

The present invention relates to a novel process for the preparation of metal joining paste. The invention will be described particularly with respect to the preparation of solder paste useful for precision soldering where fine bore dispensing equipment is utilized, but it will be apparent to those skilled in the art that the present invention has other applications, for instance in the preparation of brazing and infiltration pastes. Examples of applications where fine bore dispensing equipment is utilized are the manufacture of electronic equipment and jewelry.

BACKGROUND OF THE INVENTION

Joining pastes for purposes of the present invention are comprised of two components: a powdery joining metal composition in the range of about 50 to 90%; and a vehicle in the range of about 10 to 50%. The vehicle in turn consists of a solvent for fluidity, and second phase ingredients, including a fluxing agent and various special additives such as activators to increase the fluxing action, detergents, suspending agents or surfactants, thickeners, and defoamers. The particular composition is dependent upon the application contemplated.

Present-day precision joining applications involve highly sophisticated techniques that require very specialized properties of the joining pastes. For this purpose considerable effort has been expended in the art to develop specialized formulae, exacting material specifications, and careful storage and handling controls. However, little attention has been given to the development of improved processing techniques for the preparation of the pastes. Conventionally, paste compositions are simply prepared by blending all of the ingredients together at one time in a suitable mixing vessel. The mixing or blending may or may not be carried out at high temperatures. If done at high temperatures, cooling to storage temperature may simply be allowed to take place at ordinary cooling rate, dependent upon such factors as ambient temperature, size of batch and the vessel in which the cooling takes place.

One requirement of joining pastes suitable for precision soldering techniques, such as used in the manufacture of electronic components and jewelry, is that the paste be dispensible from fine bore dispensing equipment; for instance, dispensing equipment having a bore size of about 15 to 25 gage (about 0.05 to 0.01 inches). Even general automotive applications require relatively fine bore size equipment, for instance equipment with a bore size of 1/32 to 3/16 inches. It was found that techniques of manufacture conventionally employed resulted in the preparation of pastes which may be unsuitable for automatic dispensing in small bore equipment, either because of excessive particle size of paste ingredients, or because of paste instability. By paste instability, it is meant phase separation of ingredients in the paste (suspension stability), or increase in viscosity or hardening of the paste on storage (viscosity stability). Criteria for stability are that the paste be capable of storage, for at least six months, without visible phase separation, and with a viscosity change of less than about ±15% (in centipoises).

SUMMARY OF THE PRESENT INVENTION

By the present invention, it was discovered that the above and other disadvantages could be overcome by first preparing the vehicle at an elevated temperature, and then subjecting the same to rapid cooling, under shock cooling conditions, to a final temperature inhibitive of significant reaction of the paste metal powder with vehicle acidic constituents. Metal powder preferably is blended into the vehicle subsequent to cooling. It is critical that significant exposure of metal powder to hot vehicle be avoided.

For most applications, in accordance with the concepts of the present invention, cooling will be to less than about 90° F. (about 32° C.).

For purposes of the present application, the term "vehicle" means that composition containing a normally solid fluxing agent, optional specialized additives, and a solvent in which the fluxing agent and additives, when used in the proportions necessary for joining paste applications, are substantially soluble at an elevated temperature. Such elevated temperature is that temperature at which the second phase ingredients, including flux and specialized additives, are substantially soluble in the solvent so as to produce a clear, or substantially clear, solution.

In the practice of the present invention, shock cooling is critical, and is defined as cooling from a clear or substantially clear solution, at such elevated temperature, at a sufficiently rapid rate to obtain mass nucleation or precipitation of vehicle second phase components and avoidance of significant grain growth. Preferably the paste has a maximum particle size (of second phase ingredients, primarily flux) not substantially greater than about forty (40) microns, with a majority of the particles being less than about ten (10) microns, as determined by a Fineness-Of-Grind Gage.

For most practical purposes, in accordance with the concepts of the present invention, cooling takes place at an average rate of at least 3° F. per minute.

In a preferred embodiment of the present invention, cooling is carried out in a cooling zone having indirectly cooled heat exchange surface with continuous scraping of cooled layer from said surface. However, cooling is carried out with as little mechanical agitation as possible.

Following shock cooling, there is obtained a vehicle having a thick, creamy consistency, and a crystalline second stage of very fine particle size, rendering it suitable for blending with a suspension of fine particle size metal powder. At the point of addition of the metal powder, other fine particle size additives, for instance a fine ground flux activator composition, may also be introduced into the vehicle.

The viscosity of the final paste product is that necessary for convenient dispensing in fine bore dispensing equipment. For most applications, in accordance with the concepts of the present invention, the viscosity falls within 30,000 to 500,000 centipoises, preferably 80,000 to 200,000 centipoises (as measured at 78° F. by a Brookfield Viscometer, Model No. RVF, using a No. 7 spindle at 20 r.p.m.), depending upon the particular ingredients and proportions employed. Proportions are those necessary to achieve a viscosity within these ranges.

It was found, that by employing shock cooling, the viscosity desired remained substantially constant in storage, for a period of six months or longer, within 15% (in terms of centipoises) of that desired. In addition, it was found that the vehicle and/or paste were exceptionally stable, in that no visible phase separation occurred during a six-month storage period.

The invention and advantages thereof will become apparent upon consideration of the following specification, with reference to the accompanying drawing, and following Examples, in which.

Figure 1:
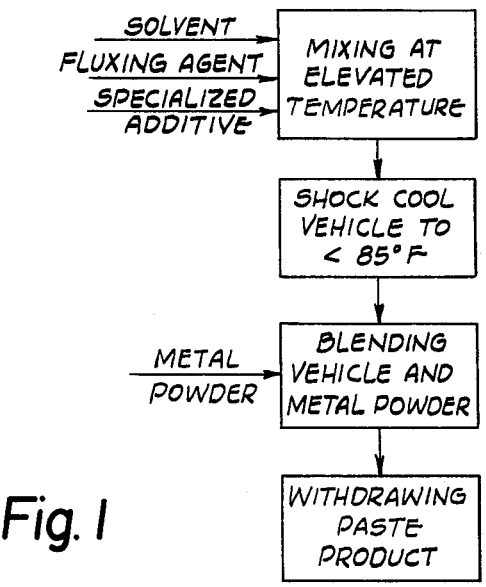
FIG. 1 is a flow diagram illustrating the process of the present invention.

Referring to FIG. 1, the present invention preferably comprises introducing solvent, fluxing agent and specialized additives, which make up the vehicle component of the joining paste, into a suitable mixing vessel, and heating the same up to an elevated temperature and holding the same at such temperature, with mixing, until the specialized additives and fluxing agent are completely dissolved or substantially completely dissolved in the vehicle solvent. Following this, the vehicle components are subjected to shock cooling conditions to reduce the temperature of the vehicle to preferably less than 90° F. During shock cooling, the fluxing agent and perhaps certain of the specialized additives precipitate out of the solvent to leave a creamy paste consistency. At this point, fine metal powder, and optionally other fine particle size additives, are introduced into the vehicle and are mixed with the same, for a sufficient period of time to obtain a homogeneous mixture. The paste product is then withdrawn from the mixing vessel. It may or may not be subjected to screening, and is finally packaged.

EXAMPLE 1

In this Example, preparation of a solder paste suitable for precision soldering applications is illustrated. The following vehicle ingredients were employed:

| Ingredient | Percent |
|---|---|
| Rosin | 55 |
| Carbowax 6000 (Trademark, Union Carbide) | 10 |
| Ozokerite Wax | 4 |
| Diethylcarbitol | 13 |
| N-methyl-2-pyrrolidone | 18 |
| Total | 100 |

This paste formulation is characterizable as non-corrosive, having only a mild fluxing action. The only fluxing agent used was rosin. Diethylcarbitol and N-methyl-2-pyrrolidone act as co-solvents for the vehicle formulation. These are non-toxic ingredients, have relatively high vapor pressures such that they do not readily evaporate, and yield a flux vehicle of salve-like consistency in which the rosin precipitates out, upon cooling, to provide a colloidal precipitate. The Carbowax 6000 is a product of Union Carbide Corporation, and is polyethylene glycol, molecular weight 6000. This compound functions primarily as a surfactant. The ozokerite wax is a mineral wax and functions primarily as a thickening agent. The particular ozokerite wax employed was 77 W Flakes (trademark, Frank B. Ross Co., Inc.) having a melting point of 164°–174° F., and a penetration of 8, at 77° F., determined by using a Krebs Electronic Mfc. Co. penetrometer, having 1/10 mm divisions, and a 50 gram weight (ASTM test D 1321-65 or D5-65).

In this Example, the rosin employed was Primarex 80, trademark, Sylvachem Corporation. This product is a tall oil rosin having a typical composition of about 87% rosin acids, 3.3% fatty acids, and 4.5% unsaponifiables. Typical specifications are:

| Color, USDA, maximum | XA | (ASTM D 509) |
|---|---|---|
| Acid No., minimum | 165 | (ASTM D 465) |
| Softening Point, minimum | 73° C. | (ASTM E 28) |
| Saponification No. | 179 | (ASTM D 464) |

Figure 2:
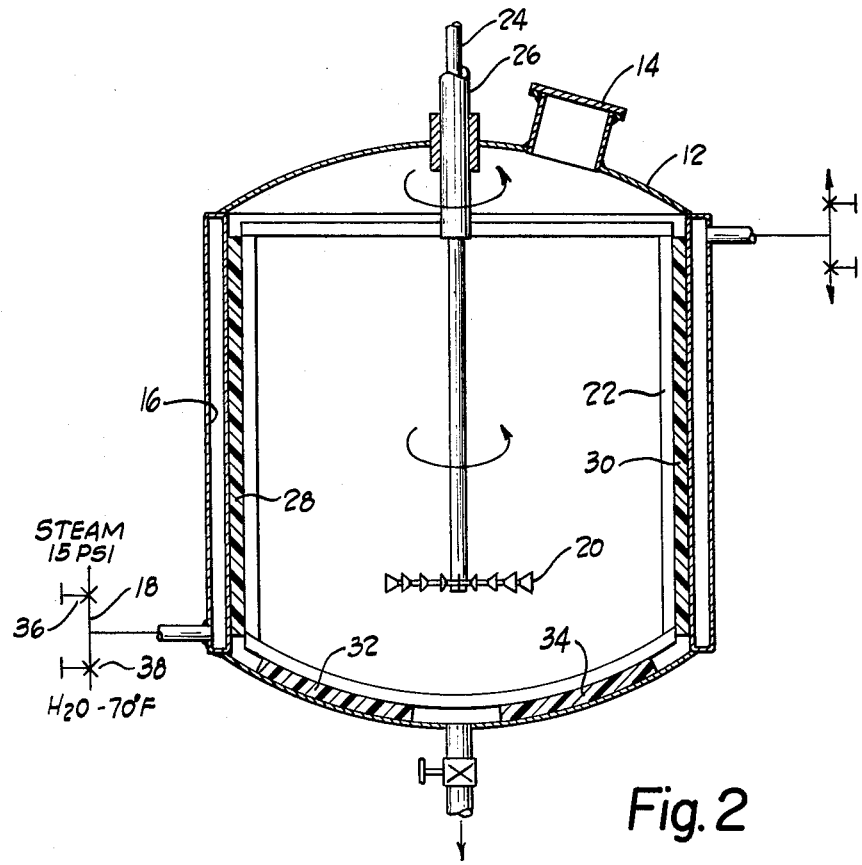
FIG. 2 is a section elevation view of a mixing vessel for the practice of the process of FIG. 1.

Referring to FIG. 2, the preparation of the paste was carried out by introducing the solvent, fluxing agent, and specialized additives into vessel 12 via charging port 14. Steam at 15 psi was introduced into the vessel jacket 16 via inlet 18 and the entire mixture was heated to a temperature of about 190° to 200° F. (about 88°–93° C.). Care was taken during the heating step to insure that the temperature did not exceed 205° F. (about 96° C.).

During the heating step, the vehicle ingredients were subjected to continuous mixing employing a high-speed impeller mixer 20, and a scraper 22. Initially, during the heating step, only the scraper was employed, at about 27 r.p.m. After about 12 minutes of mixing with the scraper 22, the high-speed impeller mixer 20 was rotated at about 650 r.p.m., and mixing was continued for an additional 13 minutes. This gave an overall heating and mixing time of about 25 minutes, at the end of which all components were dissolved in the vehicle solvent, to produce a clear solution.

In this particular Example, the mixing vessel was one manufactured by Big H Equipment Corporation. It is referred to as a concentric shaft mixer, Model No. HCS-2, having a capacity of about 15 gallons. The impeller 20 and scraper blade 22 are mounted on separate concentric shafts 24 and 26, respectively, and are independently driven by separate motor and gear mountings, not shown. The scraper is essentially a U-shaped element which extends contiguous with the side walls of the vessel, and across the bottom of the vessel. The scraper blades are of a synthetic polymer, for instance nylon or polytetrafluoroethylene (resistant to common commercial solvents). Four blades were employed, the blades 28 and 30 contacting the side walls of the vessel, and spaced-apart blades 32 and 34 contacting the bottom wall of the vessel.

Although the times for heating and mixing can vary depending upon vehicle composition, representative times are 20–40 minutes for heating (to avoid charring), and 5–15 minutes for mixing at elevated temperature, to avoid evaporation of solvent and degradation of ingredients.

The scraper 22 and impeller mixer 20 may be rotated at variable speeds, for instance from about 15 to 50 r.p.m. for the scraper, and about 550 to 750 r.p.m. for the high-speed impeller.

The heating temperature, to which the vehicle ingredients are heated, can also vary within a wide range, depending upon particular ingredients and proportions selected. Generally, speaking, the heating is carried out to a temperature of about 180° F. to 260° F. (about 82° C. to about 127° C.). Too low a heating temperature hampers dissolving of the flux and additive ingredients in the solvent and attainment of proper particle size on cooling. Overheating tends to cause chemical degradation, decomposition and evaporation loss.

At the completion of mixing and heating, steam valve 36 was moved to a closed position shutting off the steam flow to the vessel jacket and water valve 38 was opened introducing water [at about room temperature of about 70° F. (21° C.)] to the jacket. Rotation of the high-speed impeller 20 was stopped, and mixing was continued with the scraper 22, still at about 27 r.p.m. Rate of cooling was maintained at about 3° F. per minute average, until the entire mixture became opaque and vehicle temperature was about 80° F. (about 27° C.).

It is understood that during cooling falling temperature periods will be interrupted by fairly constant temperature periods when precipitation of certain vehicle components takes place. The rate of cooling of at least 3° F. per minute refers to the average temperature drop in the cooling cycle.

In this particular example, cooling took place in about 30 minutes.

The final temperature to which the vehicle ingredients are cooled is critical, and should be that temperature inhibitive of significant reaction of metal powder with vehicle acidic constituents. Generally speaking, the final temperature will be less than about 90° F. (about 32° C.). Below about 45° F. (about 7° C.) the vehicle becomes too viscous for optimum mixture of metal powder with the vehicle.

Following cooling of the vehicle, the particle size of the vehicle paste was determined, employing a Fineness-Of-Grind Gage, similar to a Hegman Gage, identifiable as Gardner Laboratories Model GR-6409, having a scale of 0–180 microns. The particle size was determined to be less than 40 microns, with a majority of the particles having a particle size of less than 10 microns. Viscosity at 78° F. was 35,000 to 60,000 centipoises.*

*As determined by a Brookfield Viscometer (supra).

On completion of cooling, metal powder was introduced into the vessel, at charging port 14, and mixing was continued, employing the scraper, still at about 27 r.p.m., for an additional 45 minutes. During the cooling and blending steps, gentle agitation is important. Cooling and blending are carried out with as little mechanical agitation as possible. The metal was introduced into the vessel in the proportion of about 80% metal powder to about 20% vehicle. The metal powder employed was 60/40 solder powder (having 60% lead and 40% tin), and was of a particle size permitting it to pass through a 200 mesh Tyler screen (about 75 microns). Following mixing with the powdered metal, the solder paste was determined to have a particle size of less than about 75 microns, using a Fineness-Of-Grind Gage, with most of the paste having a particle size of less than about 65 microns.

The final solder paste product was then subjected to screening through a 20 mesh Tyler screen, although this step is not necessary, and was packed. The product was readily dispensable employing automatic dispensing equipment having a bore size of about 15 to 25 gage, and was suitable for use with precision soldering techniques, for instance in the manufacture of electronic components and jewelry. The product had a viscosity of 35,000 to 65,000 centipoises (supra), and also showed good suspension and viscosity stability, as defined above. The paste soldered well on copper or brass, without spattering under direct flame.

The present invention is suitable for the manufacture of brazing and infiltration pastes in addition to soldering pastes. In this regard, the metal powder component can be any metal, oxide or alloy, which under the conditions of temperature and/or atmosphere prevailing during the joining operation, is capable of mechanically bonding or fusing with a metal, oxide or alloy substrate or substrates to which it is applied. By way of example, it can be any of the usual joining materials such as soft solder alloy powders (lead and tin powder mixtures), zinc and tin powder mixtures for joining aluminum, copper and copper oxide powder, copper and phosphorus-copper powder, and silver powder.

The metal powder particle sizes employed are dependent upon application, and particularly on dispensing equipment used. In the case of solder pastes, using soft lead-tin alloy powders, the particle size should be less than 100 mesh. For dispensing in 15 to 25 gage bore equipment, the metal powder preferably passes through a 325 mesh Tyler screen.

Solvents which can be employed in the process of the present invention are those normally liquid, organic compounds conventionally used in the preparation of joining pastes. It is critical that the solvent be nonvolatile at the elevated temperature employed in the mixing of the paste vehicle components, and that it be one in which the second phase ingredients (primarily flux) are non-soluble at room temperature. Examples of suitable solvents are dihydroxydiethyl ether monooleate; Pluronics L-61 (polyoxyalkylene derivative of propylene glycol, trademark, Wyandot Chemical); dihydroxy diethyl ether; 1,2-dihydroxy propane; diethylene glycol diethyl ether; 1,2-ethandediol; isopropanol; water; glycerol; methoxy polyethylene glycols; ethylene glycolmonobutyl ether acetate;ethylene glycol monohexyl ether; light mineral oils; gasoline; kerosene; diethylene glycol monohexyl ether; methyl ethyl ketone and dimethyl benzene. Particularly effective results were obtained using a ketone such as N-methyl-2-pyrrolidone. This solvent has a high boiling point and is miscible with many polar and non-polar co-solvents. Other suitable such ketones are N-vinyl-2-pyrrolidone, N-beta-hydroxy-ethylpyrrolidone, and 1-ethyl-2-pyrrolidinone.

The flux ingredient can be any organic or inorganic flux conventionally employed in joining pastes, preferred fluxes being rosin or beta-alanine. Other suitable fluxes are monobasic carboxylic acids such as capric acid and lauric acid; dibasic carboxylic acids such as adipic acid and fumaric acid; tribasic carboxylic acids such as citric acid; aromatic acids such as benzoic acid and isophthalic acid; malic acid; polyalkyl glycol distearate; amine derivatives such as hydrazine dihydrobromide, urea, hydrazine dihydrochloride, monoethanolamine hydrobromide, triethanolamine, dimethylformamide, and triethylamine hydrobromide; and inorganic fluxes such as boric acid, ammonium chloride, zinc ammonium chloride, and postassium fluoroborate. They should be soluble, in the proportions conventionally employed, in the solvent at elevated temperature, and non-soluble at room temperature.

The particular additives employed are dependent upon application or use of the joining paste. As with the flux, they also should be soluble in the solvent, at elevated temperature, and non-soluble at room temperature. Typical additives are one or more surfactants, thickening agents, detergents, activators and defoamers.

The particular additives used are not critical in the practice of the present invention, and follow known technology. Surfactants include fatty alkanolamides, and nonylphenoxypoly (ethyleneoxy)ethanol. A preferred surfactant is Carbowax 6000, a polyethylene glycol molecular weight 6000 marketed by Union Carbide. Suitable thickening agents are hydroxyethylcellulose, methocellulose, and xanthan gum. A preferred thickener is ozokerite wax, one such wax being 77 W Flakes, mentioned above, manufactured by Frank B. Ross Co. The wax is fully saturated and is exceptionally stable to oxidation.

As with the selection of components used, the proportions employed are dependent upon end use or application. The metal powder component normally is present in the range of 50-90%, and the vehicle is present in the range of about 10-50%. The amount of solvent in the vehicle is that necessary to obtain a clear or substantially clear solution at the mixing temperature selected, and also is dictated by the viscosity of end product desired.

EXAMPLE 2

This Example illustrates the preparation of a solder paste having relatively strong fluxing activity. It is useful in the soldering of fabricated metals, for instance in the automotive industry, and in the soldering of jewelry.

| Ingredient | | Percent |
|---|---|---|
| Flux Ingredients | | |
| Adipic acid | | 14 |
| Urea | | 14 |
| Polyalkyl glycol distearate (Peg 6000 DS, Trademark, Union Carbide) | | 3 |
| Solvents | | |
| Dihydroxy diethyl ether monooleate (Peg 400 M.O., Trademark, Union Carbide) | | 40 |
| Polyoxyalkylene derivative of propylene glycol (Pluronics L-61, Trademark, Wyandot Chemical) | | 18 |
| N-methyl-2-pyrrolidone | | 1 |
| Activator | | |
| Beta-alanine | 2.5% | |
| Triethylamine hydrobromide | 2.5% | 10 |
| N-methyl-2-pyrrolidone | 5.0% | |
| Total | | 100% |

In this Example, generally the same procedure as Example 1 was employed, except that the activator formulation was separately ground to fine particle size and added to the cooled vehicle, of other flux and solvent ingredients, subsequent to cooling, for instance with addition of metal. Fine grinding of the activator formulation was by wet grinding, using an amount of the N-methyl-2-pyrrolidone as a solvent, to approximately the same particle size as the metal, for instance about less than 85 microns, measured with a Fineness-Of-Grind Gage. As with the metal, this particle size was dictated by bore size of the automatic dispensing equipment. By constrast, the solvent/flux formulation was cooled at a sufficiently fast rate to obtain a particle size less than about 30 microns (as determined on a Fineness-Of-Grind Gage) to obtain satisfactory viscosity stability and suspension stability. Viscosity of the vehicle was determined to be 30,000 to 40,000 centipoises as measured at 78° F. by a Brookfield Viscometer mentioned above.

The vehicle, including activator, was blended with lead-tin alloy (6040) powder, in the proportion of 80% metal powder to 20% vehicle to manufacture the final paste product.

Specific data on the procedure employed were as follows:

| | |
|---|---|
| Vehicle heating temperature | 220° F. (104°C.) |
| Heating time | 15-25 minutes |
| Additional mixing time | 25 minutes |
| Cooling time | about 20 minutes |
| Final temperature of cooling | 90° F. (32° C.) |
| Mixing with activator | 10 minutes. |

The high-speed impeller mixer 20 was used during initial heating and mixing, at about 650 r.p.m., and for about the first five minutes of the cooling cycle, after which mixing was carried out using the scraper 22, at about 27 r.p.m. The scraper was used throughout the processing cycle.

In this Example, the activator and metal can be blended into the vehicle at any time, together, or separately. In all instances, it is possible to prepare the paste vehicle and store the same for substantial periods of time prior to blending with metal and/or activator. It is, of course, understood that other crystalline or normally solid additive ingredients, other than activator, can be blended into the paste vehicle subsequent to preparation of the same.

In the above Examples, batch processing was employed. The present invention also lends itself to continuous processing. This is carried out by mixing the vehicle components, at elevated temperature, in one mixing vessel, using preferably indirect heat exchange, and then continuously passing the fluid product to a continuous indirect heat exchanger, which can be a counter current or co-current type chiller comprising a vessel or series of vessels through which a coolant is passed around an inner vessel or series thereof containing the fluid product. Rotary scrapers are disposed in the inner vessel or series thereof to prevent build-up of chilled product on the vessel walls. However, here also, minimum mechanical agitation is desired. Shock cooling, however, is effected to reduce the temperature of the vehicle to that necessary to inhibit significant reaction of metal powder with vehicle acidic constituents. The cooled product is continuously transmitted from the chiller, by means of a Moyno pump or similar positive displacement pump, to a mixing vessel, wherein by employing conventional mixing techniques, metal powder is blended into the vehicle paste.

Instead of cooling with indirect heat exchange, it is possible to shock cool in other ways, for instance by employing a metal powder which has been supercooled to a sufficiently low temperature to effect shock cooling. The temperature of the metal powder should be sufficiently low that undue or excessive exposure of the metal powder to the hot vehicle is avoided. Since the weight porportion of metal powder to vehicle is on the order of 4 to 1, cooling by super-cooled metal powder can be readily effected. Of course, cooling by direct heat exchange with super-cooled metal can be utilized in combination with indirect cooling, to effect shock cooling. Generally speaking, the more rapid the cooling the better.

It is critical that the final temperature of the metal powder be inhibitive of significant reaction of metal powder with vehicle acidic constituents. Such final temperature can be raised somewhat by providing a protective coat on the metal powder, and it is understood that this is within the scope of the present invention. For instance, the metal powder can be provided with a protective wax coat employing a wax which has a higher melting point than the elevated temperature employed for mixing the vehicle ingredients, but which at the same time is readily dispersed at soldering temperatures.

What is claimed is:

1. A process for making metal joining paste suitable for fine bore dispensing containing a vehicle and metal powder suitable for joining, said process comprising:

preparing said vehicle by mixing together the vehicle ingredients including an organic solvent and a fluxing amount of a normally solid joining paste flux at an elevated temperature sufficient to render the flux substantially soluble in said solvent;

cooling said vehicle under shock cooling conditions at an average rate of at least about 3° F. per minute that produce a sufficiently uniform distribution of fine precipitate particles of said flux necessary for such fine bore dispensing;

blending a joining amount of said metal powder with said vehicle, said blending taking place without significant exposure of the powder metal to the vehicle at elevated temperature; and collecting the resulting product paste at a temperature sufficiently low to be inhibitive of significant reaction of the metal powder with vehicle.

2. The process of claim 1 wherein said vehicle contains normally solid additives in addition to said flux and cooling is at a rate sufficient to achieve a particle size of said flux and additives of not substantially greater than about 40 microns.

3. The process of claim 1 wherein said cooling is carried out in a cooling zone having indirectly cooled heat exchange surface with continuous scraping of cooled layer from said surface.

4. The process of claim 1 wherein said cooling is to a temperature of less than about 90° F.

5. The process of claim 1 wherein said solvent is selected from the group consisting of N-methyl-2-pyrrolidone, N-vinyl-2-pyrrolidone, N-beta-hydroxyethylpyrrolidone, 1-ethyl-2-pyrrolidinone, dihydroxydiethyl ether monooleate, polyoxyalkylene derivative of propylene glycol, dihydroxy diethyl ether, 1,2-dihydroxypropane, glycerol, diethylene glycol diethyl ether, isopropanol, water, and mixtures of the above.

6. The process of claim 1 wherein said solvent comprises N-methyl-2-pyrrolidone.

7. The process of claim 1 wherein said flux is a compound selected from the group consisting of rosin, beta-alanine, monobasic organic acids, dibasic organic acids, tribasic organic acids, aromatic acids, polyalkyl glycol distearate, amine organic derivatives, boric acid, and inorganic ammonium, zinc, sodium or potassium halides.

8. The process of claim 1 wherein said joining paste is a solder paste comprising a tin-lead solder powder, N-methyl-2-pyrrolidone, rosin, a thickener, and a surfactant.

9. The process of claim 1 wherein said metal powder and vehicle are employed in the proportions of approximately 50–90% metal powder and 10–50% vehicle.

10. The process of claim 1 further including blending a flux activator into the cooled vehicle in addition to the metal powder.

11. A process for making metal joining paste, particularly suitable for fine bore dispensing for precision soldering, brazing, or infiltration, containing a vehicle and metal powder suitable for soldering, brazing, or infiltration, comprising the steps of (a) preparing a paste vehicle by mixing together, at an elevated temperature, vehicle ingredients including an organic solvent, a fluxing amount of a normally solid joining paste flux and paste additives normally insoluble in said solvent, said elevated temperature being sufficiently high to render said flux and paste additives substantially soluble in said solvent;

(b) rapidly cooling said vehicle at an average rate of at least about 3° F. per minute sufficient to obtain a fine particle size suspension of flux and additives in said solvent wherein the maximum particle size of flux and additives is not substantially greater than about 40 microns, with a majority of the particles being less than about 10 mircons, as determined by a Fineness-Of-Grind Gage;

(c) thereafter blending a joining amount of fine particle size metal powder with said vehicle;

(d) cooling of the paste vehicle being to a temperature inhibitive of significant reaction of metal particles with vehicle.

12. The process of claim 11 wherein said cooling is to a temperature of less than about 90° F.

13. The process of claim 11 wherein said elevated temperature is in the range of about 180° F. to about 260° F.

14. A metal joining paste, particularly suitable for precision soldering, brazing, or infiltration, prepared by the process of claim 13.

15. A metal joining paste, particularly suitable for precision soldering, brazing, or infiltration, comprising a blend of metal powder suitable for joining and vehicle in the proportions of approximately 50–90% metal powder and 10–50% vehicle, said vehicle comprising a fluxing amount of a normally solid flux, an organic solvent and specialized additive ingredients with at least said flux defining a second phase in the solvent, said second phase having a maximum particle size not substantially greater than about 40 microns with a majority of the particles being less than about 10 microns, as determined by a Fineness-Of-Grind Gage.

* * * * *

UNITED STATES PATENT AND TRADEMARK OFFICE
CERTIFICATE OF CORRECTION

PATENT NO. : 4,218,248
DATED : August 19, 1980
INVENTOR(S) : John L. Snyder and Paul D. Johnson It is certified that error appears in the above-identified patent and that said Letters Patent are hereby corrected as shown below:

Column 4, line 64, after "Generally", omit the comma;
Column 6, line 8, after "aluminum", add --,copper powder,--;
Column 7, line 68, after "alloy", should read --(60/40)--;

Signed and Sealed this

Second Day of December 1980

[SEAL]

Attest:

SIDNEY A. DIAMOND

Attesting Officer

Commissioner of Patents and Trademarks